United States Patent
Knibb et al.

(10) Patent No.: US 9,703,576 B2
(45) Date of Patent: Jul. 11, 2017

(54) ASPECT SCOPING IN A MODULARITY RUNTIME

(75) Inventors: David Evans Knibb, Yorkshire (GB); Matthew Alexander Webster, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 2944 days.

(21) Appl. No.: 12/061,972

(22) Filed: Apr. 3, 2008

(65) Prior Publication Data

US 2009/0083708 A1    Mar. 26, 2009

(30) Foreign Application Priority Data

Apr. 5, 2007    (EP) .................................... 07105807

(51) Int. Cl.
*G06F 9/44*    (2006.01)
*G06F 9/445*    (2006.01)

(52) U.S. Cl.
CPC .............. *G06F 9/445* (2013.01); *G06F 8/316* (2013.01)

(58) Field of Classification Search
USPC ........................................................ 717/126
See application file for complete search history.

(56) References Cited

U.S. PATENT DOCUMENTS

| | | | | |
|---|---|---|---|---|
| 6,442,750 B1 * | 8/2002 | Lopes et al. | ................. | 717/126 |
| 6,467,086 B1 * | 10/2002 | Kiczales et al. | ............. | 717/165 |
| 7,254,624 B2 * | 8/2007 | Kinyon et al. | ................. | 709/220 |
| 7,818,733 B2 * | 10/2010 | Hargrave et al. | ............. | 717/166 |
| 7,849,469 B1 * | 12/2010 | Michel et al. | ................. | 719/316 |
| 2003/0182577 A1 * | 9/2003 | Mocek | .......................... | 713/201 |
| 2005/0114683 A1 * | 5/2005 | Jin et al. | ....................... | 713/187 |
| 2005/0193119 A1 * | 9/2005 | Hayes, Jr. | ..................... | 709/227 |
| 2005/0223101 A1 * | 10/2005 | Hayes, Jr. | ..................... | 709/228 |
| 2006/0026570 A1 * | 2/2006 | Chan et al. | .................... | 717/127 |
| 2006/0080640 A1 * | 4/2006 | Cheng et al. | ................. | 717/120 |
| 2006/0288352 A1 * | 12/2006 | Lucas | ........................... | 719/328 |
| 2007/0011451 A1 * | 1/2007 | Botzum et al. | ............... | 713/166 |
| 2008/0229261 A1 * | 9/2008 | Rajamani et al. | ................ | 716/5 |

OTHER PUBLICATIONS

Menzini et al., "Variability Management with Feature-Oriented Programming and Aspects," ACM, 2004, 10pg.*
Lee et al., "Enabling Smart Spaces with OSGi," IEEE, 2003, 6pg.*
Lopez, Angel Nunez, "Concurrent Aspects," Master's Thesis published by Vrije Universiteit Brussel—Belgium, 2006, 68pg.*

* cited by examiner

*Primary Examiner* — Ryan Coyer
(74) *Attorney, Agent, or Firm* — Winstead, P.C.

(57) ABSTRACT

A method and system are provided for aspect scoping in a modularity runtime. The method includes declaring a set of aspects of a bundle as public aspects in a first aspect configuration file, and filtering the aspect configuration files imported by a bundle to the files from bundles on which the importing bundle has a dependency. The method includes declaring a set of aspects of a bundle as private aspects in a second aspect configuration file. At weaving of aspects at a bundle, the weaving includes: any aspects defined as private aspects; any aspects defined as public aspects; any imported aspects; and any first configuration files from exporting bundles are declared.

20 Claims, 5 Drawing Sheets

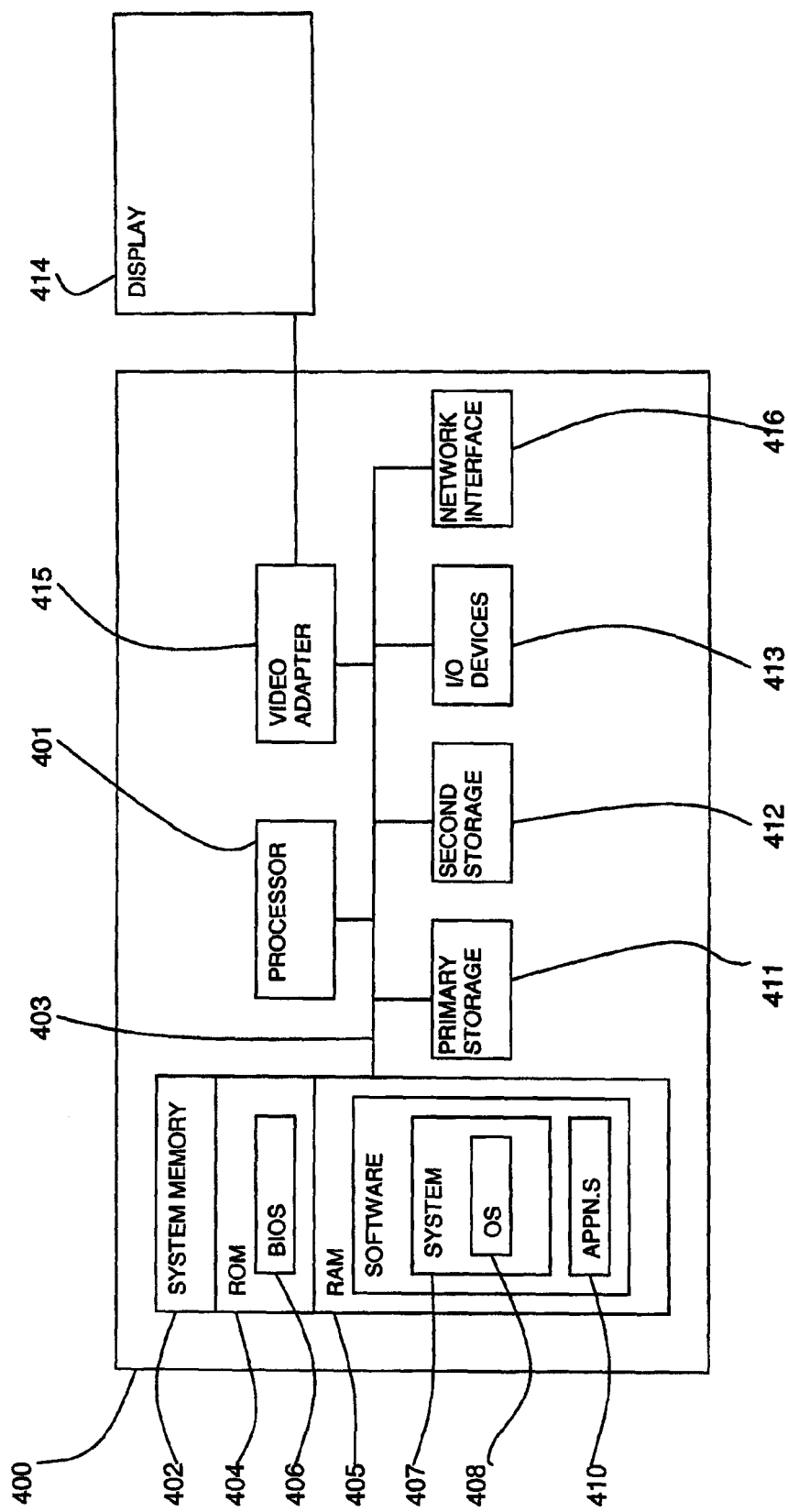

ASPECT SCOPING IN A MODULARITY RUNTIME

FIELD OF THE INVENTION

This invention relates to the field of a modularity runtime environment. In particular, it relates to aspect scoping in a modularity runtime.

BACKGROUND

A runtime environment is a virtual machine state which provides software services for processes or programs while a computer is running. A runtime library is a collection of utility functions which support a program while it is running by working with the operating system. The Java Virtual Machine (JVM) (Java is a trademark of Sun Microsystems, Inc.) is an example of a runtime. The .NET framework is another example of a runtime.

The OSGi (Open Services Gateway initiative) modularity framework provides a dynamic component model for JVM environments. Applications or components in the form of bundles for deployment can be remotely managed and management of Java packages/classes is specified in detail. For example, the Eclipse platform (Eclipse is a trade mark of the Eclipse Foundation) is an open-source, platform independent software framework including the OSGi bundling framework.

The OSGi modularity framework provides the ability to define classes and resources (for example, configuration files) that are private to a particular application. It also allows an application to explicitly declare its dependence on other applications, frameworks or libraries. The net effect is that some classes are invisible to an application.

Aspect-oriented programming (AOP) aids programmers in the separation of concerns to improve modularity. Some aspects of system implementation, such as logging, error handling, standards enforcement and feature variations are notoriously difficult to implement in a modular way. The result is that code is tangled across a system and leads to quality, productivity and maintenance problems. AspectJ is a seamless aspect-oriented extension to the Java programming language that enables clean modularization of these "crosscutting concerns". An aspect is treated as a class by OSGi in terms of visibility. A mechanism is required by AspectJ to determine which types in the system are aspects. The meta-data associated with the aspects must be visible to applications, except where an aspect is known to be private.

The load-time weaving (LTW) feature of AspectJ requires that the set of all aspects to be used to weave classes defined by a particular class loader are declared before any weaving takes place. This set must remain unchanged for the lifetime of the class loader. This emulates the process of weaving the set of classes that comprise an application during an earlier build process prior to execution.

An aspect configuration file is typically created during the compilation process and declares the aspects. In a runtime system, a complete set of all aspects visible to a class loader can be obtained without prior knowledge of the hierarchy topology.

A problem is that an aspect configuration file associated with a particular bundle is visible to every other bundle in the same runtime regardless of whether the aspects it declares are also visible (i.e. exported or imported). This causes a failure during LTW initialization that is indistinguishable from a user configuration error which may cause an application to behave incorrectly or fail.

One approach used by the AJEER project (AJEER is a trade mark of Open Source Technology Group) which provides AspectJ load-time aspect weaving (http://sourceforge.net/projects/ajeer/) is to register all aspects with the runtime and ensure they are all visible. However, this can have unexpected side affects on bundles if the scope of an aspect is incorrect. Also, in a moderately sized system (for example, the Eclipse platform) centrally published aspects are known to have an unacceptable affect on start-up performance.

Another approach would be to use one aspect configuration file for every exported package. That way a bundle could enumerate the set of visible bundles and attempt to load the corresponding configuration file. Unfortunately, the set of packages that is visible to a bundle cannot always be determined and a possibly large set of aspect configuration files would be difficult to maintain.

The problem described above is given in the context of aspects in the OSGi framework. However, the solution provided of aspect scoping may be applied to other modularity runtimes.

SUMMARY

It is an aim of the present invention to both restrict the set of aspects declared as public to a bundle, and filter the set of files actually imported by a bundle. In this way, filtering the set of aspects declared is carried out so that it coincides with the set that is visible.

According to a first aspect of the present invention there is provided a method for aspect scoping in a modularity runtime, comprising: declaring a set of aspects of a bundle as public aspects in a first aspect configuration file; and filtering the aspect configuration files imported by a bundle to the files from bundles on which the importing bundle has a dependency. The bundles may be bundles of applications or components.

The method may include declaring a set of aspects of a bundle as private aspects in a second aspect configuration file. A bundle may export a package defining an aspect and may export a first aspect configuration file. A bundle may import a package defining an aspect from another bundle and may import a first aspect configuration file from the exporting bundle.

When weaving aspects at a bundle, the weaving may include: any aspects defined as private aspects; any aspects defined as public aspects; any imported aspects; and wherein any first configuration files from exporting bundles are declared.

According to a second aspect of the present invention there is provided a system for aspect scoping in a modularity runtime having multiple bundles with declared aspects, comprising: means for declaring a set of aspects of a bundle as public aspects in a first aspect configuration file; and means for filtering the aspect configuration files imported by a bundle to the files from bundles on which the importing bundle has a dependency.

The system may also include means for declaring a set of aspects of a bundle as private aspects in a second aspect configuration file.

The system may include a dependency mechanism for determining the dependencies between bundles, and an aspect discovery mechanism for determining aspects which are public and the aspects which are private, the aspect discovery mechanism also including the means for filtering the aspect configuration files.

A bundle may include means for exporting a package defining an aspect and means for exporting a first aspect configuration file. A bundle may further include means for importing a package defining an aspect from another bundle and means for importing a first aspect configuration file from the exporting bundle.

A weaving mechanism for weaving of aspects at a bundle may include weaving: any aspects defined as private aspects; any aspects defined as public aspects; any imported aspects; and wherein any first configuration files from exporting bundles are declared.

According to a third aspect of the present invention there is provided a computer program product stored on a computer readable storage medium for aspect scoping in a modularity runtime, comprising computer readable program code means for performing the steps of: declaring a set of aspects of a bundle as public aspects in a first aspect configuration file; and filtering the aspect configuration files imported by a bundle to the files from bundles on which the importing bundle has a dependency.

BRIEF DESCRIPTION OF THE DRAWINGS

Embodiments of the present invention will now be described, by way of examples only, with reference to the accompanying drawings in which:

FIG. 4 is a block diagram of a computer system as known in the art in which the present invention may be implemented.

Referring to FIG. 1, a block diagram shows a computer system 100 including a modularity framework as known in the art. The system 100 includes computer hardware 101 on which runs an operating system 102. A framework 110 may run directly on the operating system 102 (for example, in the case of the .NET framework running on a Windows operating system (Windows is a trade mark of Microsoft Corporation). In the embodiment illustrated in FIG. 1, the framework 110 runs on a virtual operating system 103 which in turn runs on the operating system 102. The virtual operating system 103 may be the Java Virtual Machine (JVM).

Figure 1:
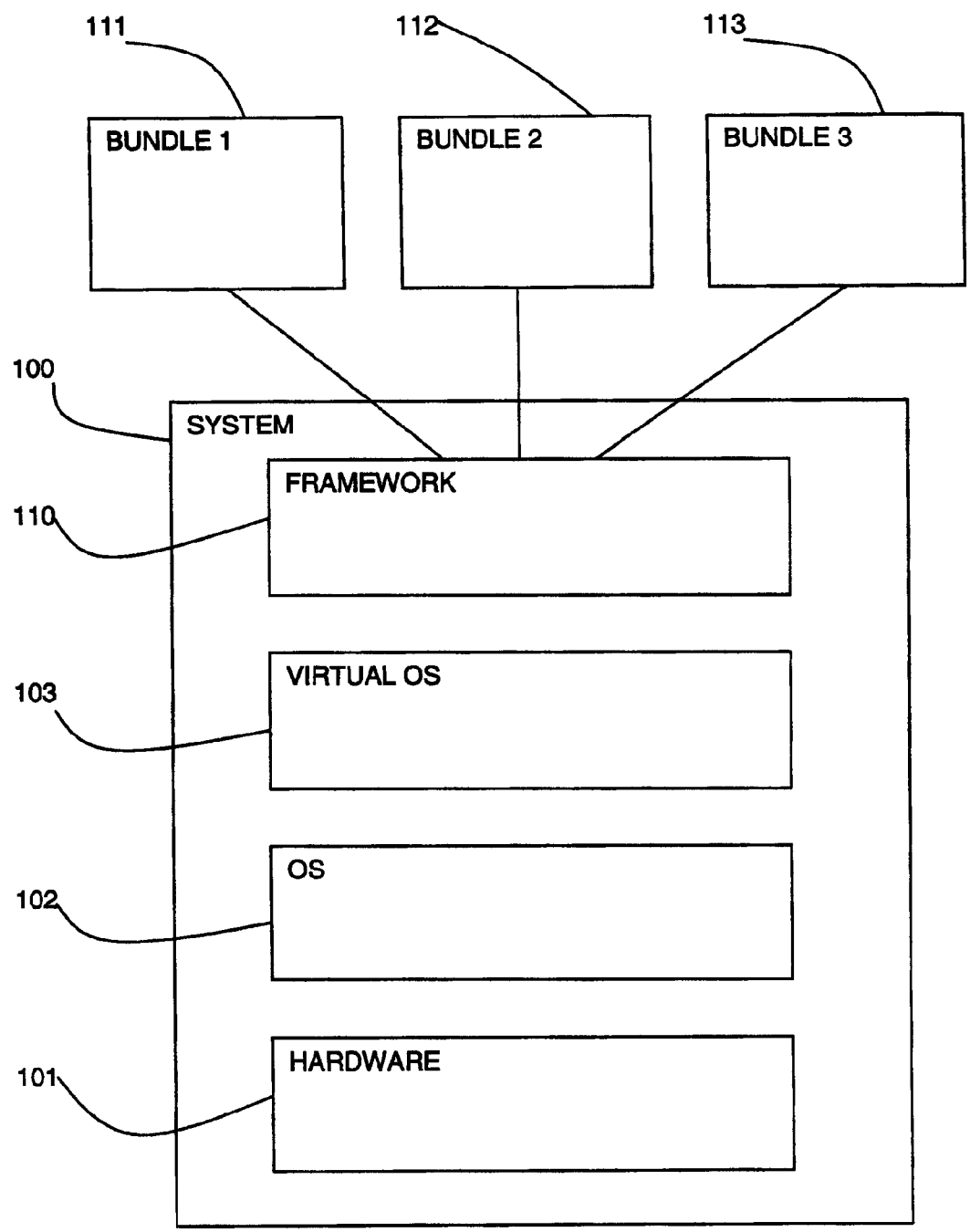
FIG. 1 is a block diagram of a modularity framework as known in the prior art.

The framework 110 implements a dynamic component model and provides system services to applications or components which are defined in the form of bundles 111-113. The system services may include life cycle management of the applications and components.

The modularity framework 110 provides an ability to define classes that are private to a particular application. It also allows an application to explicitly declare its dependence on other applications, frameworks or libraries. This means that some classes are invisible to an application.

In aspect-oriented programming (AOP), aspects are treated as a class by the modularity framework 110 in terms of visibility. A mechanism is required by the aspect-oriented extension to the Java programming language, AspectJ, to determine which types in the modularity framework 110 are aspects. The meta-data associated with the aspects must be visible to applications, except where an aspect is known to be private.

The weaving feature of AspectJ requires that the set of all aspects to be used to weave classes in a particular namespace are registered before any weaving takes place. This set must remain unchanged for the duration of the weaving process. For example the set of aspects used to weave the classes defined by a class loader must remain unchanged for the lifetime of that class loader. The weaving process may take place at different times, compile-time, post-compile time (also referred to as binary weaving), and load-time.

An aspect configuration file in XML (extended mark-up language) format, typically generated during the compilation process, is located in a well defined location ("META-INF/aop.xml") relative to the aspects it declares. In the class loader hierarchy of a runtime system every aop.xml file defined by a particular class loader (for example, located in the classpath of a URLClassLoader) is visible to all its delegates. This approach means that with a single API (ClassLoader.getResources(String)) a complete set of all aspects visible to a class loader can be obtained without prior knowledge of the hierarchy topology.

The OSGi runtime environment abstracts the namespace associated with a class loader to a bundle. Additional meta-data associated with a bundle can restrict the set of classes and hence the aspects that are visible (exported) to other bundles. It may also determine the set of classes that a bundle wishes to use (import) from another bundle. This is done using package names.

However, the default meta-data directory used by aop.xml cannot be exported. When using AspectJ load-time weaving under OSGi, the aop.xml file is typically copied to the org.aspectj package which is exported. Unfortunately, this means that an aop.xml file associated with a particular bundle is visible to every other bundle in the same runtime regardless of whether the aspects it declares are also visible (i.e. exported or imported).

The solution is both to restrict the set of aspects declared as public to a bundle, and to filter the set of aspect configurations files (aop.xml files), actually imported by a bundle. In this way, filtering is carried out of the set of aspects declared so that it coincides with the set that is visible.

Figure 2:
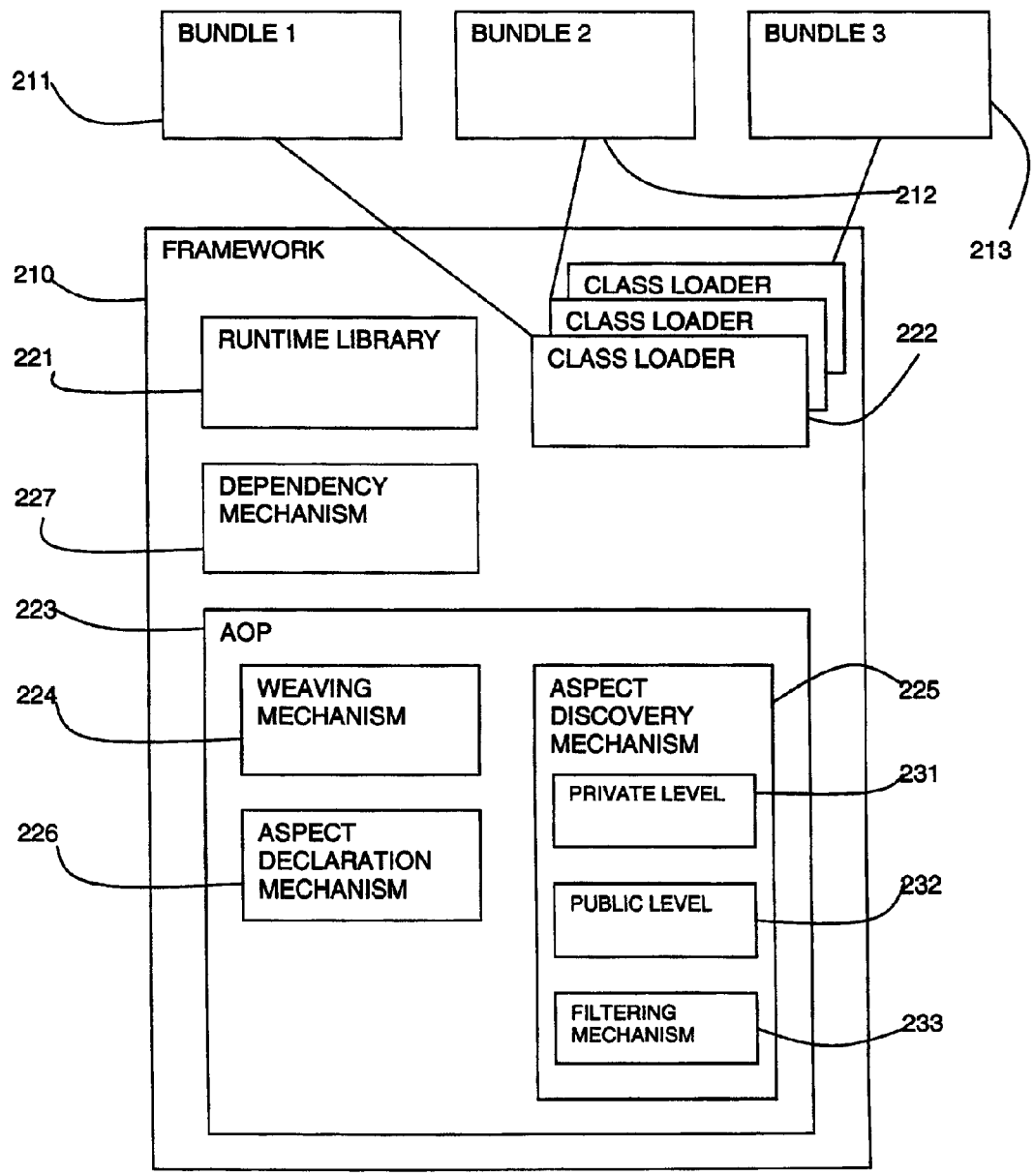
FIG. 2 is a block diagram of a modularity framework in accordance with the present invention.

Referring to FIG. 2, a block diagram is shown of a described framework 210. The framework 210 provides system services to bundles 211-213 of applications or components. The framework 210 includes a runtime library 221, a set of class loaders 222, one for each bundle 211-213 and a dependency mechanism 227.

An aspect-oriented mechanism 223 includes a weaving mechanism 224, an aspect discovery mechanism 225 and an aspect declaration mechanism 226.

The aspect discovery mechanism 225 includes two levels. A first level 231 determines the set of aspects private to a bundle 211-213. These are aspects which are only used locally in a bundle 211-213. For example, this first level 231 of declaration could be in the form of an aspect configuration file "META-INF/aop.xml".

A second level 232 of the aspect discovery mechanism 225 determines aspects which are public. These are aspects which are used locally in a bundle 211-213 and used by other bundles 211-213. For example, this second level 232 of declaration could be in the form of an aspect configuration file "org/aspectj/aop.xml".

In this example embodiment, the aspect configuration files are given as XML files. However, other forms of configuration file may also be used.

The aspect discovery mechanism 225 also includes a filtration mechanism 233 which ensures that only aspect configuration files from bundles 211-213 on which the importing bundle 211-213 has a dependency are used. It uses the dependency mechanism of 227 of the framework.

Figure 3A:
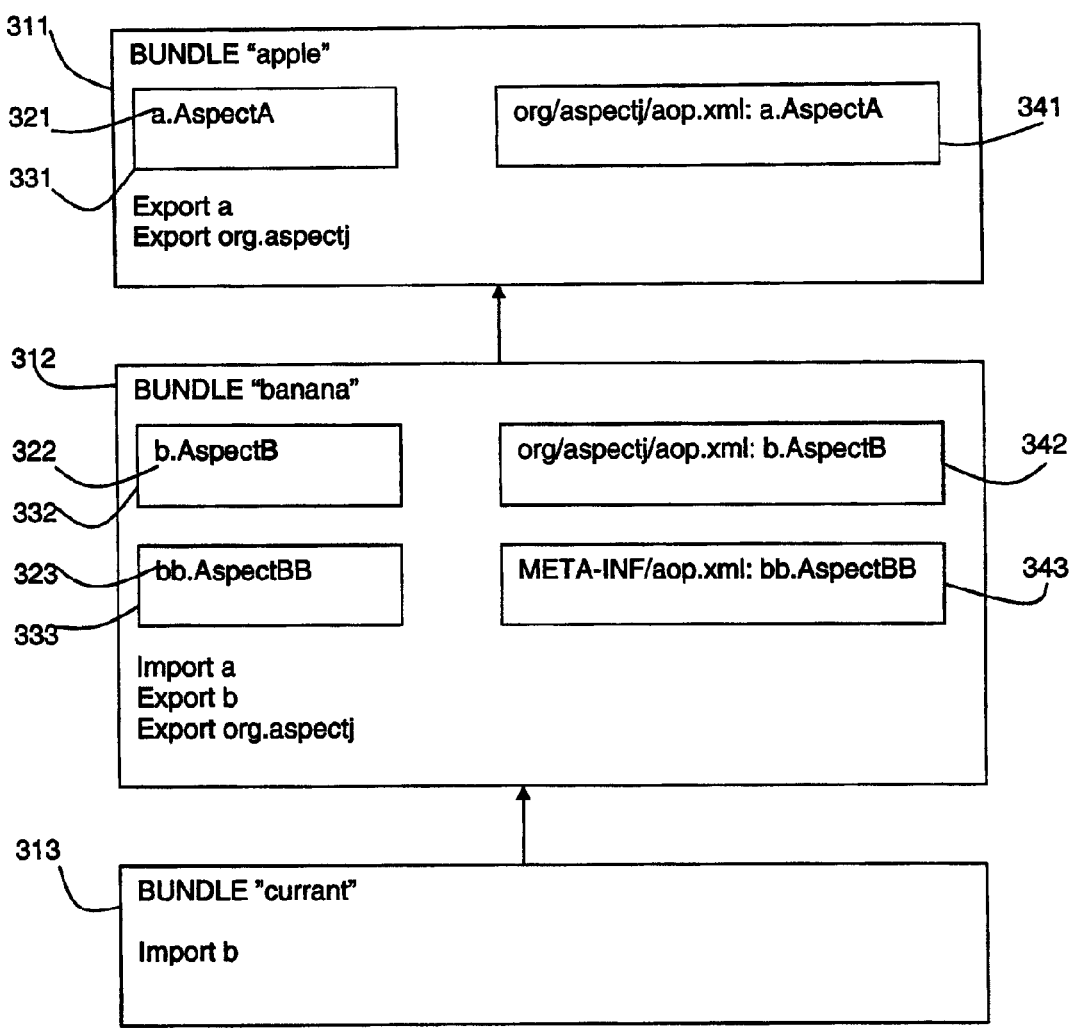
FIGS. 3A and 3B are schematic diagrams of methods in accordance with the present invention.
Figure 3B:
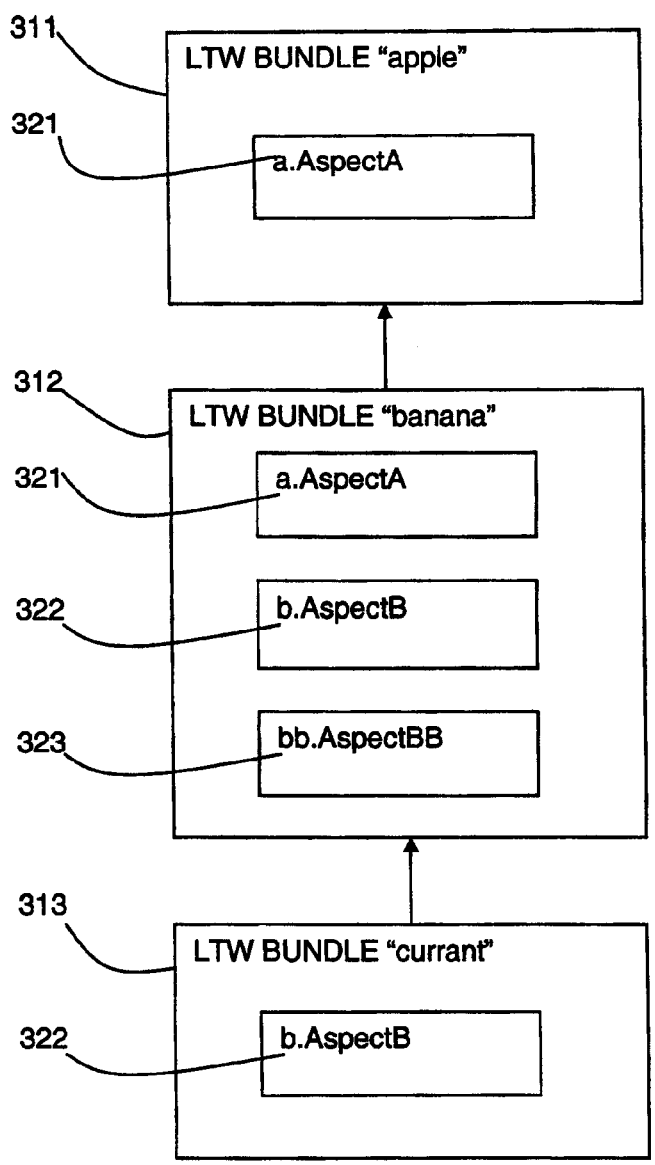

FIGS. 3A and 3B shows a schematic representation of the described method. There are three bundles "apple" 311, "banana" 312, and "currant" 313 shown in FIG. 3A.

The aspects are declared as follows:

Bundle "apple" 311 declares an aspect a.AspectA 321 in package a 331. The public aspect declaration file 341 includes a.AspectA 321. Bundle "apple" 311 exports package a 331. The bundle "apple" 311 also exports the public aspect declaration file in package org.aspectj 341.

Bundle "banana" 312 declares an aspect b.AspectB 322 in package b 332 and exports it. Bundle "banana" 312 declares an aspect bb.AspectBB 323 in package bb 333 which it does not export. The public aspect declaration file 342 includes b.AspectB 322. The private aspect declaration file 343, located in the META-INF local directory of the bundle, includes bb.AspectBB 323. Bundle "banana" 312 also imports package a 331. Bundle "banana" 312 also exports the public aspect declaration file in package org.aspectj 342.

Bundle "currant" 313 imports package b 332.

FIG. 3B shows how the aspects are woven, for example, at load-time weaving, as follows:

The locally defined aspect a.AspectA 321 is woven into bundle "apple" 311.

The aspect a.AspectA 321 is imported by and woven into bundle "banana" 312. The locally defined aspects b.AspectB 322 and bb.AspectBB 323 are also woven into bundle "banana" 312.

Only aspect b.AspectB 322 is visible to, imported by and woven into bundle "currant" 313. The aspect bb.AspectBB 323 is not visible but neither is it declared public. The public aspect declaration file (org/aspectj/aop.xml) 341 exported from bundle "apple" 311 is visible but the aspect a.AspectA 321 that it declares is not. As there is no dependency between bundle "currant" 313 and bundle "apple" 311, the configuration is filtered and the aspects that the public aspect declaration file (org/aspectj/aop.xml) 341 lists are not declared.

The author of an aspect bundle need only create a single aspect configuration file (i.e. org/aspectj/aop.xml) to determine which aspects are public.

The author of an application bundle only need use existing OSGi meta-data (bundle-manifest) to determine which aspects are to be used. Aspects are typically declared in the same package and often the same bundle as the Java classes whose functionally they are helping to provide. Therefore, no additional configuration need be provided by a bundle wishing to use an aspect other than importing the org.aspectj package.

The extent of bundle weaving and hence good performance is not reliant on the scope of a particular aspect, but on OSGi meta-data. An aspect may be written without any prior knowledge of the system into which it will be deployed. If the author is too narrow with the scope of the aspect, (i.e. using specific class or package names) it may not be used with a range of different applications. However, if the scope is too broad the aspect may affect too many classes. By enabling a bundle author to specify exactly which packages and hence which aspects are to be used, the extent of bundle weaving can be better controlled.

When enumerating the set of aspect configuration files visible to a particular bundle using ClassLoader.get-Resources(String), it is possible to determine the exporting bundle. It is also possible to determine those bundles on which a particular bundle depends. By filtering the set of aspect configuration files to those exported by a dependent bundle, only those aspects that are visible will be declared.

Referring to FIG. 4, a computer system 400 is shown on which the present invention may be implemented. A computer system 400 has a central processing unit 401 with primary storage in the form of memory 402 (RAM and ROM). The memory 402 stores program information and data acted on or created by the programs. The program information includes the operating system code for the computer system 400 and application code for applications running on the computer system 400. Secondary storage includes optical disk storage 403 and magnetic disk storage 404. Data and program information can also be stored and accessed from the secondary storage.

The computer system 400 includes a network connection means 405 for interfacing the computer system 400 to a network such as a local area network (LAN) or the Internet. The computer system 400 may also have other external source communication means such as a fax modem or telephone connection.

The central processing unit 401 includes inputs in the form of, as examples, a keyboard 406, a mouse 407, voice input 408, and a scanner 409 for inputting text, images, graphics or the like. Outputs from the central processing unit 400 may include a display means 410, a printer 411, sound output 412, video output 413, etc.

In a distributed system, a computer system 400 as shown in FIG. 4 may be connected via a network connection 405 to a server on which applications may be run remotely from the central processing unit 401 which is then referred to as a client system.

Applications which may run on the computer systems from a storage means or via a network connection may include word processing programs, Internet access programs including search engines for searching the World Wide Web, other text indexing and retrieving programs for databases, machine translation programs for translating foreign language documents, optical character recognition programs for recognizing characters from scanned documents, etc.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for aspect scoping in a modularity runtime, comprising:
   declaring a set of aspects of a first bundle as public aspects in a first aspect configuration file; and
   filtering aspect configuration files imported by the first bundle from other bundles on which the first bundle has a dependency.

2. A method as claimed in claim 1, including:
   declaring a set of aspects of the first bundle as private aspects in a second aspect configuration file.

3. A method as claimed in claim 1, wherein the first bundle exports a package defining an aspect and exports the first aspect configuration file.

4. A method as claimed in claim 1, wherein the first bundle imports a package defining an aspect from a second bundle and imports a first second aspect configuration file from the second bundle.

5. A method as claimed in claim 1, wherein when weaving aspects at the first bundle, the weaving includes:
   any aspects defined as private aspects;
   any aspects defined as public aspects;
   any imported aspects; and wherein
   any aspect configuration files from exporting bundles are declared.

6. A method as claimed in claim 1, wherein the modularity runtime is an Open Services Gateway initiative (OSGi) framework.

7. A system, comprising:
   a memory unit for storing a computer program for aspect scoping in a modularity runtime having multiple bundles with declared aspects; and
   a processor coupled to the memory unit, wherein the processor is configured to execute the program instructions of the computer program comprising:
      declaring a set of aspects of a first bundle as public aspects in a first aspect configuration file; and
      filtering aspect configuration files imported by the first bundle from other bundles on which the first bundle has a dependency.

8. A system as claimed in claim 7, wherein the program instructions of the computer program further comprise:
   determining dependencies between bundles.

9. A system as claimed in claim 7, wherein the program instructions of the computer program further comprise:
   declaring a set of aspects of the first bundle as private aspects in a second aspect configuration file.

10. A system as claimed in claim 7, wherein the program instructions of the computer program further comprise:
    determining aspects which are public and aspects which are private and filtering the aspect configuration files.

11. A system as claimed in claim 7, wherein the first bundle exports a package defining an aspect and exports the first aspect configuration file.

12. A system as claimed in claim 7, wherein the first bundle imports a package defining an aspect from a second bundle and imports a second aspect configuration file from the second bundle.

13. A system as claimed in claim 7, wherein when weaving aspects at the first bundle, the weaving includes:
    any aspects defined as private aspects;
    any aspects defined as public aspects;
    any imported aspects; and wherein
    any aspect configuration files from exporting bundles are declared.

14. A system as claimed in claim 7, wherein the modularity runtime is an Open Services Gateway initiative (OSGi) framework.

15. A computer program product stored on a computer readable storage medium, wherein the medium does not include a propagating signal, for aspect scoping in a modularity runtime, comprising computer readable program code for performing the steps of:
    declaring a set of aspects of a first bundle as public aspects in a first aspect configuration file; and
    filtering aspect configuration files imported by the first bundle from other bundles on which the first bundle has a dependency.

16. The computer program product as recited in claim 15 further comprising computer readable program code for performing the step of:
    declaring a set of aspects of the first bundle as private aspects in a second aspect configuration file.

17. The computer program product as recited in claim 15, wherein the first bundle exports a package defining an aspect and exports the first aspect configuration file.

18. The computer program product as recited in claim 15, wherein the first bundle imports a package defining an aspect from a second bundle and imports a second aspect configuration file from the second bundle.

19. The computer program product as recited in claim 15, wherein when weaving aspects at the first bundle, the weaving includes:
    any aspects defined as private aspects;
    any aspects defined as public aspects;
    any imported aspects; and wherein
    any aspect configuration files from exporting bundles are declared.

20. The computer program product as recited in claim 15, wherein the modularity runtime is an Open Services Gateway initiative (OSGi) framework.

* * * * *